(12) United States Patent
Yeh et al.

(10) Patent No.: US 7,479,628 B1
(45) Date of Patent: Jan. 20, 2009

(54) DRUM-TYPE VOLUME SOURCE CALIBRATION PHANTOM AND CALIBRATION METHOD THEREOF

(75) Inventors: Chin-Hsien Yeh, Taoyuan County (TW); Ming-Chen Yuan, Taoyuan County (TW)

(73) Assignee: Institute of Nuclear Energy Research, Tiaan Village, Longtan, Taoyuan (TW)

( * ) Notice: Subject to any disclaimer, the term of this patent is extended or adjusted under 35 U.S.C. 154(b) by 0 days.

(21) Appl. No.: 11/875,960

(22) Filed: Oct. 22, 2007

(51) Int. Cl.
*G01D 18/00* (2006.01)
(52) U.S. Cl. .................................. 250/252.1
(58) Field of Classification Search ............... 250/252.1
See application file for complete search history.

(56) References Cited

U.S. PATENT DOCUMENTS

2006/0193421 A1* 8/2006 Orr .......................... 376/156

OTHER PUBLICATIONS

Marinkovic et al., "Kernel-Integration Scatter Model for the Characterization of Nuclear Waste Drums by Gmaa Emission Tomography,", Sep. 2002, Japanese Journal of Applied Physics, vol. 41, pp. 5757-5761.*

* cited by examiner

*Primary Examiner*—David P Porta
*Assistant Examiner*—Kiho Kim

(57) ABSTRACT

A drum-type volume source calibration phantom is provided, which comprises a drum-type container; a plurality of plate groups stacking up inside the drum-type container, at least one slab of radioactive source, each of which is disposed between the adjacent plate groups and comprises a plurality of radionuclides. The present invention further provides a calibration method that starts by the step of providing a radioactivity test for each drum-type volume calibration phantom. Then, a calibration relationship of density vs. counting efficiency corresponding to the several different drum-type volume source calibration phantoms is performed in a waste curie monitor. Finally, a characteristic of photonic energy dependency is measured for a modification factor.

15 Claims, 15 Drawing Sheets

DRUM-TYPE VOLUME SOURCE CALIBRATION PHANTOM AND CALIBRATION METHOD THEREOF

BACKGROUND OF THE INVENTION

1. Field of the Invention

The invention is related to a calibration phantom. Especially it refers to a drum-type source calibration phantom with different densities to derive the calibration curve for density and counting efficiency. According to the counting efficiency from the multi-density source calibration phantom corresponding to the density of the sample of nuclear waste, it is a source calibration phantom to derive accurate measurement results when it measures total Gamma activity or specific activity for different nuclear waste materials.

2. Description of the Prior Art

Until now, the equipment for the total gamma activity measurement for bulk nuclear waste with extremely low activity is Waste Curie Monitor, a large-area plastic scintillation detector assembly. Its advantages include high radiation sensitivity, high counting efficiency, short counting time, unlimited waste volume and displayable weight for waste samples.

However, the calibration method for traditional activity monitor has the following shortcomings: (1) underestimate or overestimate for activity because usually it only considers weight but not material density and causes radiation self-absorption effect; (2) counting efficiency calibration is inapplicable because usually it uses single material in monitor shielding to establish density efficiency and ignores that the sample is not single component material; (3) sample measurement position is different because usually the sample is placed under the shielding, which is different from the geometric center for efficiency calibration; (4) sample volume is different; usually volume is not limited, so different distance to scintillation detector during efficiency calibration causes errors in activity analysis; it does not meet the requirement for accuracy in waste activity analysis by radiation safety administrator; (5) there is no correction for the calculation for the radiation energy for various radionuclides in radioactive waste and the Gamma activity for multiple radionuclides; it causes errors in total activity measurement.

In recent years, researchers further develop new calibration methods to replace the original method for point source efficiency at the geometric center of the activity monitor. They measure total Gamma activity for the wastes to determine classification of the wastes and non-radioactive wastes. Current efficiency calibration methods for plastic scintillation detector include: (1) US Themo-Eberline uses transmission factor to correct the self-absorption effect for different standard mass; the formula is TF=net counting with shielding source/net counting without shielding source; generally TF$\leq$1.0; assuming no shielding source in compensation air for calibration efficiency in geometric center; let the transmission factor parameter for the established water phantom calibration efficiency be 1; enter weight to mass parameter (every 10 kg in one unit); different sample weight will be correlated to that with transmission factor=1 and obtain total Gamma activity after correction; (2) German RADOS uses single-material metal plate assembly for multi-density calibration efficiency; (3) Japan Nuclear Energy Safety Organization's metal pipe and metal plate assembly for calibration efficiency for multiple radionuclides; (4) US NE Technology uses assembly of multi-radionuclide point source and single-material Brazil logs (density=1) for multi-weight (0~60 Kg) calibration efficiency. However, current correction methods still only consider approximate weight and geometry without sufficient correction for self-absorption effect and various factors in mass and energy reactions, so they fail to obtain accurate total Gamma activity.

In summary, it is necessary to have a drum-type volume source calibration phantom and measurement and calibration methods to solve the issues with traditional methods.

SUMMARY OF THE INVENTION

The invention provides a drum-type volume source calibration phantom, which uses drum-type volume source calibration phantom with different densities to measure the total Gamma activity or specific activity for different radioactive waste materials.

The invention provides a drum-type volume source calibration phantom, which uses drum-type container with same dimensions and volume to the drum-type calibration phantom to obtain accuracy in sample activity measurement under the same conditions of calibration efficiency.

In one embodiment, the invention provides a drum-type volume source calibration phantom in a detector with accommodating space that has several radioactivity detectors. The drum-type volume source calibration phantom includes a drum-type container; several plate assemblies, stacking inside the container; and at least one source plate, located between adjacent plate assemblies, with several sources on each source plate.

The above and other objects, features and advantages of the present invention will be apparent from the following detailed description taken with the accompanying drawings.

From FIG. 10A to FIG. 10D there are testing curves of activity uniformity for different planar point sources.

Figure 11:
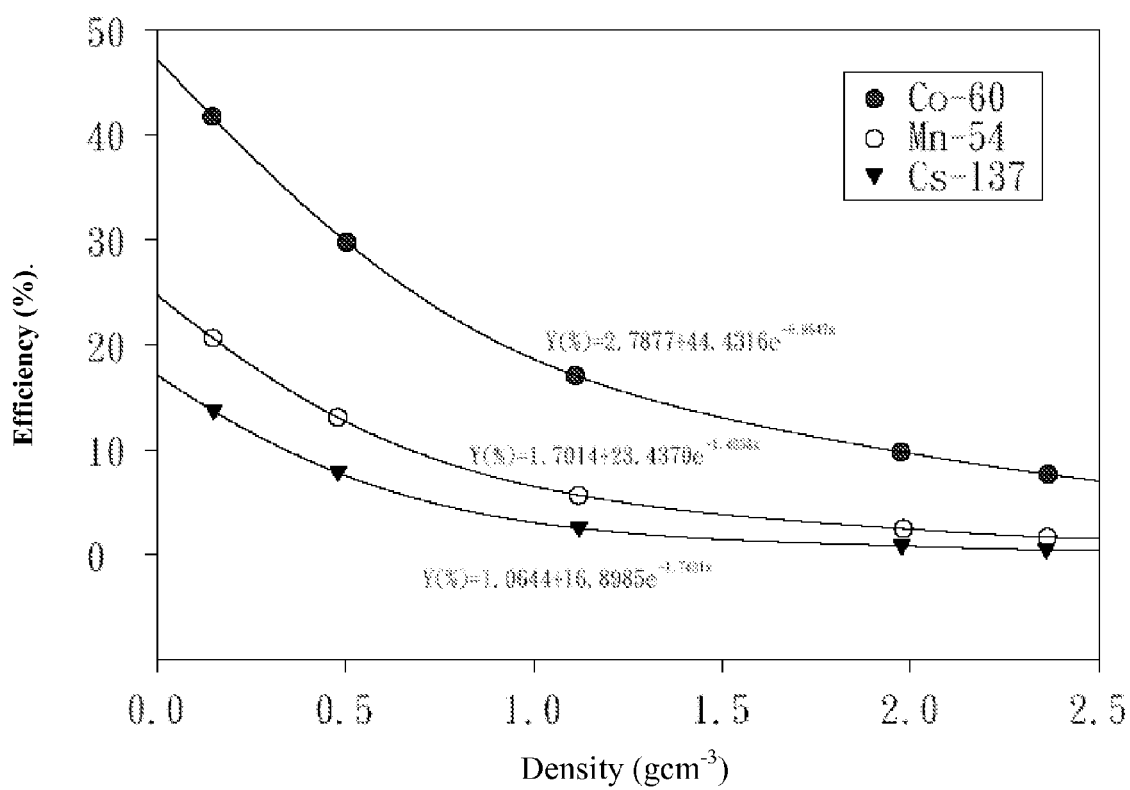

FIG. 11 is the correlation between the drum-type volume source calibration phantom and the radionuclide counting efficiency.

Figure 12:
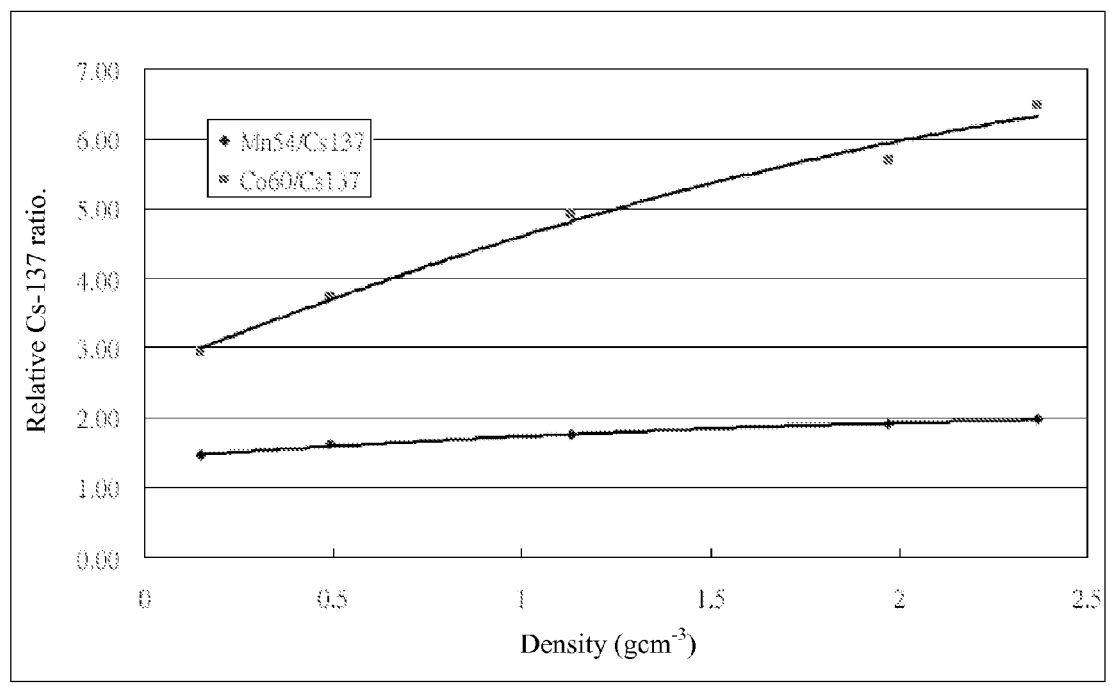

FIG. 12 is the correlation curve between the density and the ratio of counting efficiency relative to radionuclide $^{137}$C.

DETAILED DESCRIPTION OF THE PREFERRED EMBODIMENTS

Figure 1:
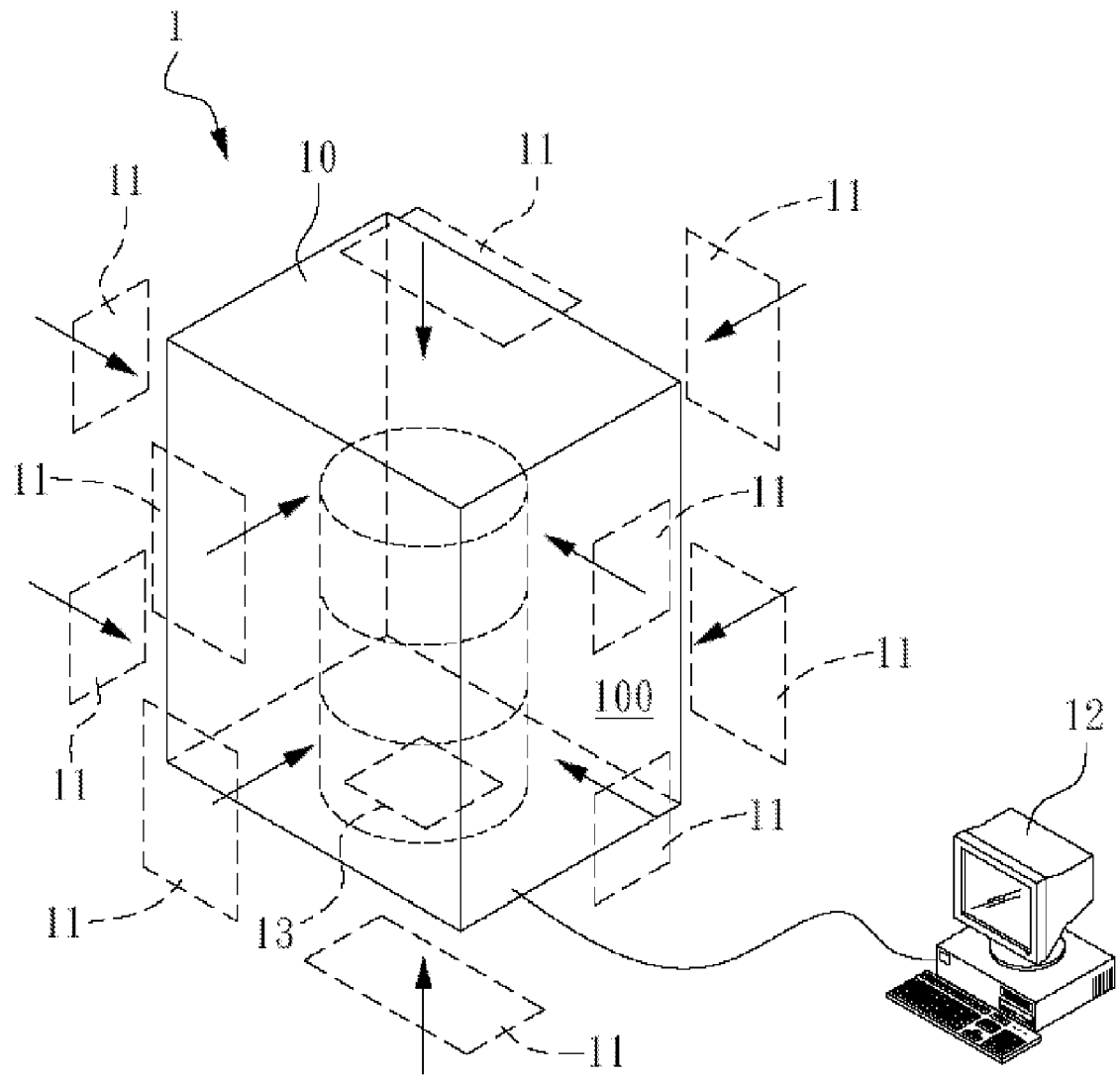
FIG. 1 is an illustration for the radioactive waste activity detector and the drum-type volume source calibration phantom for the invention.

Please refer to FIG. 1 for the activity detector for radioactive wastes and the diagram for the drum-type volume source calibration phantom. For the radioactive waste activity detector 1, there is a shielding 10, which is a hexahedron assembly that is made of lead of the same thickness. Inside the shielding 10 there is a measurement space 100, which inner wall has 10 units of the same large-area radioactivity detectors 11. In the embodiment the radioactivity detector 11 is a plastic scintillation detector. In the measurement space 100 there is a weight meter 13 to measure the object weight. The activity detector has a microcomputer processor 12 that uses the built-in calculation programs and calibration parameters for functions like sample counting, radiation total activity (Bq) for the background radiation or the specific activity (Bq/g), efficiency calibration and the minimum equipment detectable activity as well as printing and displaying analytical results.

Figure 2A:
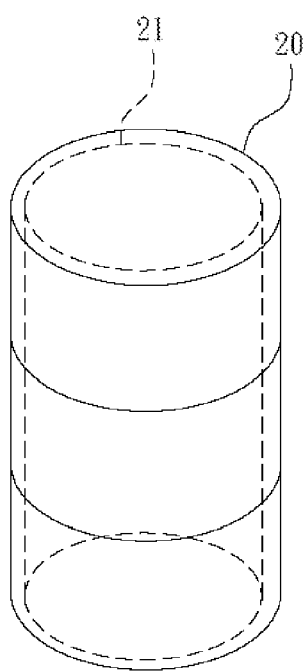
FIG. 2A is a three-dimensional diagram for the drum-type container of the invention.

In the measurement space 100 there is a drum-type volume source calibration phantom 2 with consistent activity. Please refer to FIG. 2A. The periphery for the drum-type volume source calibration phantom 2 is a drum-type container 20. The drum-type container 20 has an inner space 21. The drum-type container can be a 55-gallon container, but not be limited to this. Presently, 55-gallon drum-type container is the mainstream container for waste storage. The embodiment uses 55-gallon for explanation. Please refer to FIG. 2B. The figure is an illustration of stacking of the plates and the source plates. The inner space 21 can accommodate stacking of a plurality of homogeneous plate assembly 22 and source plates 23. The plate 22 materials can be metal or non-metal. If it is metal, it can be steel. If it is non-metal, it can be paper, wood, plastics, cement or glass et al., but not limited to these.

In the embodiment, different material is cut to a circular piece of homogeneous planar material of 40 cm diameter and 1 cm thickness, and then all pieces stack to form a homogeneous plate assembly 22. It is then placed in a drum-type container of 56 cm diameter and 86 cm height, with weight capacity of 30 kg~490 kg. With material weight and container volume (200 cm), the material average density for calibration phantom can be obtained, as examples, for paper board (density 0.15 g/cm$^3$), wood board (density 0.55 g/cm$^3$), plastics (density 1.13 g/cm$^3$), cement (density 1.80 g/cm$^3$) and glass (density 2.5 g/cm$^3$), as shown in Table 1.

Figure 2B:
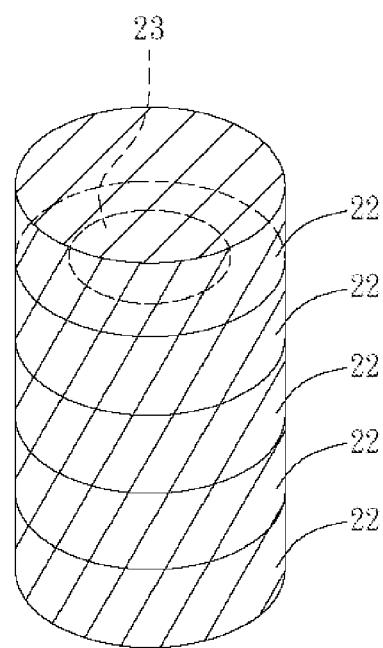
FIG. 2B is an illustration for stacking of plate assemblies and the source plates.
Figure 3A:
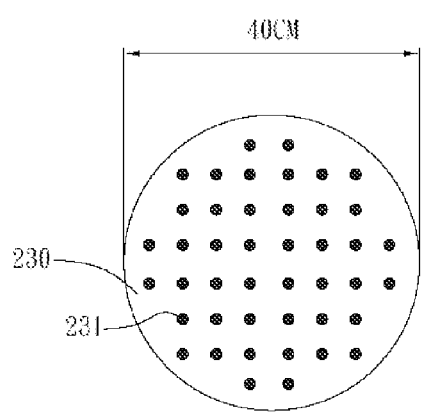
FIG. 3A is top view for source plate in a preferred embodiment of the invention.
Figure 3B:
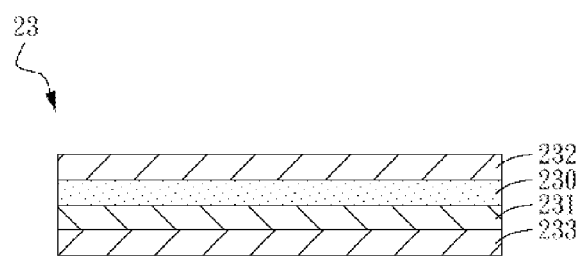
FIG. 3B is cross sectional view for the source plate.

As shown in FIG. 2B, there is a source plate 23 (only one shown in the figure for illustration) between adjacent plate assemblies 22. Please refer to FIGS. 3A and 3B. FIG. 3A has a top view diagram for a preferred embodiment of the source plate in the invention. FIG. 3B has a crossectional view for the source plate. On the leak-proof filter 231 in 40 cm diameter 44 drops of 0.2 cc homogeneous liquid sources 230 are placed. Through a top cover 232 and a bottom cover 233 on the leak-proof filter 231, a large area of circular homogeneous source plate 23 is formed. Every drop of liquid source expands to a circle in diameter less than 5 cm. The source is a γ source. The γ source can be $^{57}$cobalt, $^{137}$cesium, $^{54}$manganese, or $^{60}$cobalt or combination of either one. In the embodiment, each piece of the source has total activity of 49 kBq ($^{57}$cobalt), 35 kBq ($^{137}$cesium), 29 kBq ($^{54}$manganese) and 29 kBq ($^{60}$cobalt) respectively. With four radionuclides, $^{57}$Co, $^{137}$Cs, $^{54}$Mn and $^{60}$Co, drum-type volume source calibration phantoms with even activity and 4 different energies and previously mentioned 5 different densities can be formed.

TABLE 1

Specification for Calibration Phantom of Different Materials

| Materials | Volume (cm$^3$) | Weight (Kg) | Density (g/cm$^3$) |
|---|---|---|---|
| Paper board | 200,000 | 30 | 0.15 |
| Wood board | 200,000 | 101 | 0.49 |
| Plastics (PVC) | 200,000 | 233 | 1.13 |
| Cement | 200,000 | 422 | 1.97 |
| Glass | 200,000 | 491 | 2.37 |

Figure 4:
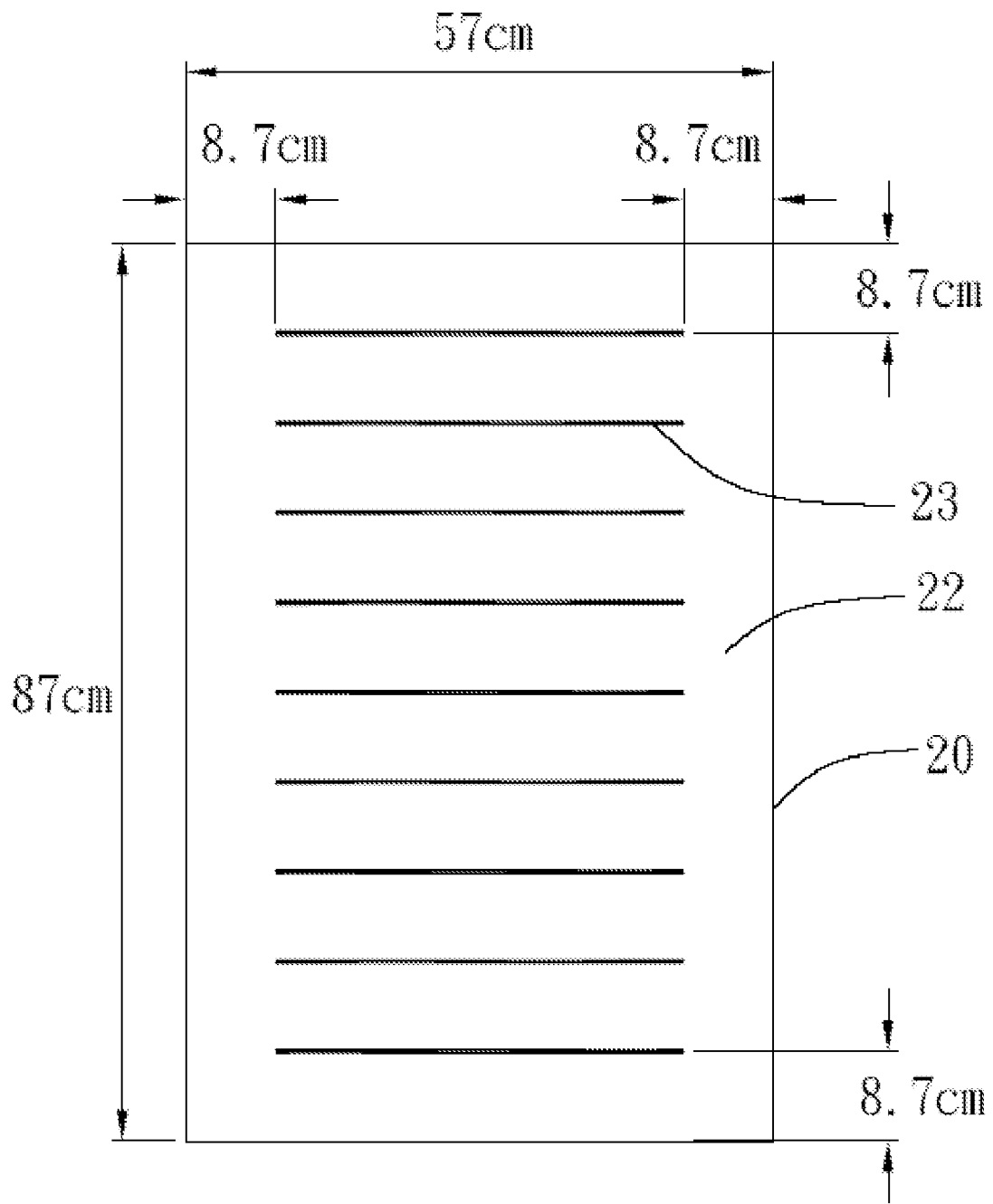
FIG. 4 is cross sectional view for the source calibration phantom of nine pieces of plate.

In a preferred embodiment, 9 pieces of large-area planar source plates 23 of each of the radionuclides, $^{57}$Co, $^{137}$Cs, $^{54}$Mn and $^{60}$Co, are horizontally placed in equal distance, 8.7 cm approximately, in five drum-type volume source calibration phantoms 2 of different densities. The crossectional view for the 9-piece drum-type volume source calibration phantom is shown in FIG. 4. Each drum-type volume source calibration phantom 2 is placed in the radioactive waste activity detector 1 (as shown in FIG. 1). The 9-piece planar source plate 23 is 8.7 cm from the ten scintillation detectors at top, bottom, left, right, front and back, comprising the drum-type volume source calibration phantoms with the uniform activity and different energies and different densities.

The following is to assess the performance of the drum-type volume source calibration phantom. The assessment includes reasonable number of the planar source for calibration phantom, activity uniformity, source accuracy, counting efficiency, and energy dependence et al. The assessment method and the result are in the following:

1. Reasonable Number of Volume Source

Figure 5:
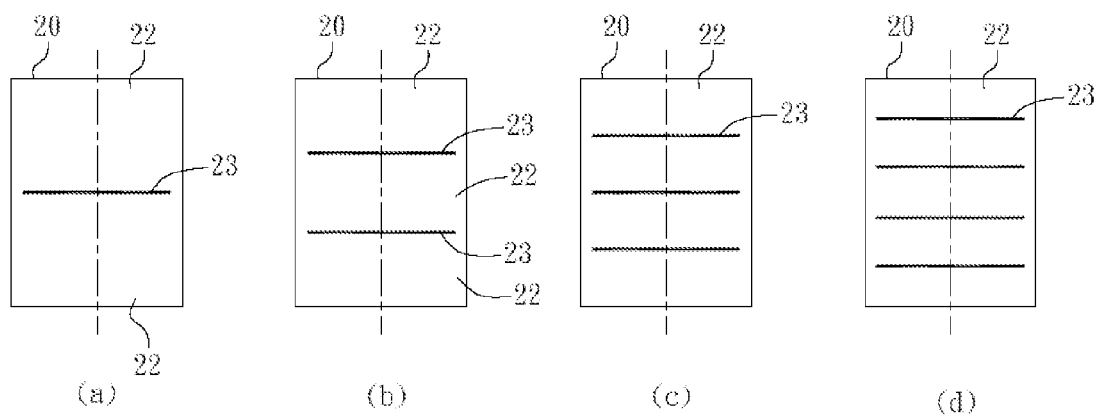
FIG. 5 is an illustration of various numbers of source plates horizontally arranged in a body calibration phantom.
Figure 6:
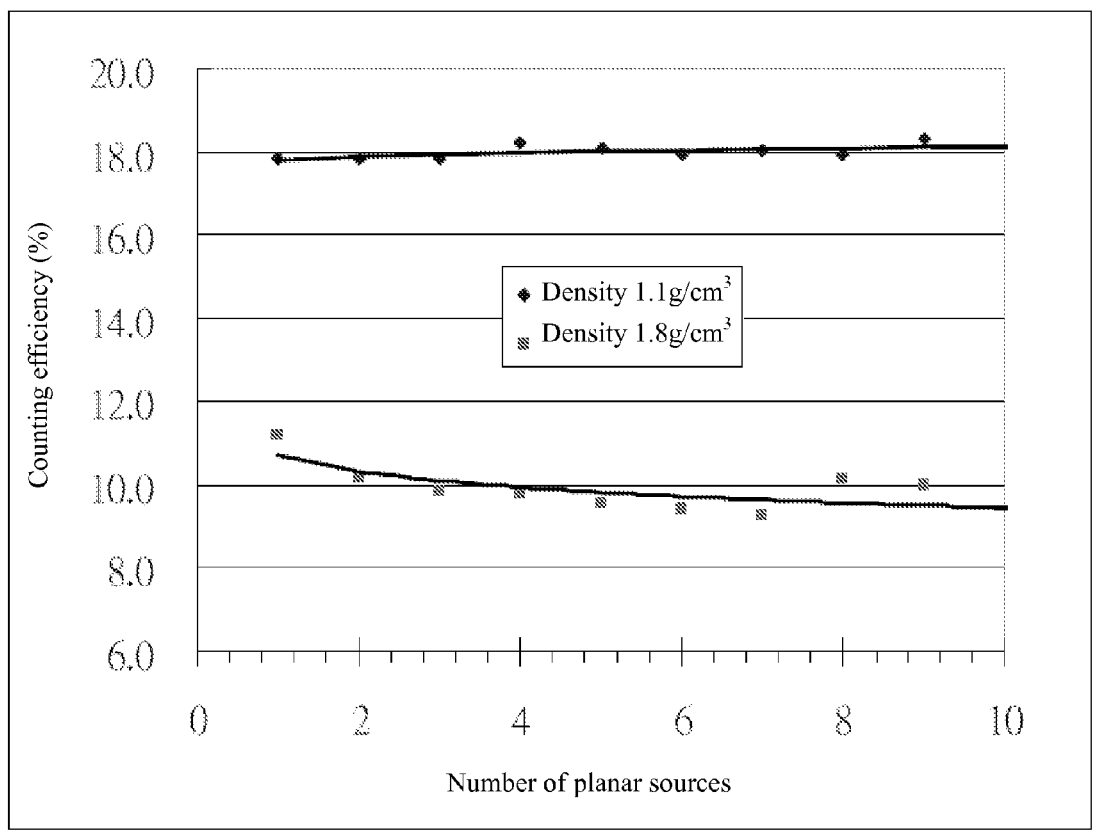
FIG. 6 is the counting efficiency diagram for the calibration phantom at density 1.1 g/cm$^3$ and 2.0 g/cm$^3$ to have different number of large-area sources.

First one piece of the nine completed $^{60}$Co large-area homogeneous source 23 (as shown in FIG. 4) is horizontally placed in the center of the drum-type calibration phantom, followed by symmetrically placing the second piece in the same distance and the remaining pieces in sequence. In the center of the calibration phantom there is a planar source plate 23 as shown in FIG. 5. FIG. 5 (a) is a one-piece planar source plate 23; FIG. 5 (b) is a two-piece planar source plate 23; FIG. 5 (c) is a three-piece planar source plate 23; FIG. 5 (d) is a four-piece planar source plate. In the calibration phantoms of densities at 1.1 g/cm$^3$ and 2.0 g/cm$^3$ there obtain the counting efficiencies for different number of pieces of large-area sources. As shown in FIG. 6, they are 17.9%~18.3% and 9.3%~10.7%, respectively. The largest difference in efficiency and average efficiency among the nine large-area sources happens in the calibration phantoms of densities at 1.1 g/cm$^3$ and 2.0 g/cm$^3$, and is 1.7% and 10.7%, respectively. In the fitting curve of large-area source counting efficiency, the efficiency does not increase with number of pieces. There is no clear trend of increase. When the number of pieces is between 3 and 7, the efficiency levels off. When the number of pieces of sources increases to 9, although the source strength gradually increases, the counting efficiency only increases by 2.0%. Thus, it is reasonable to use 9 large-area pieces of sources for calibration phantom.

2. Activity Accuracy

Figure 7:
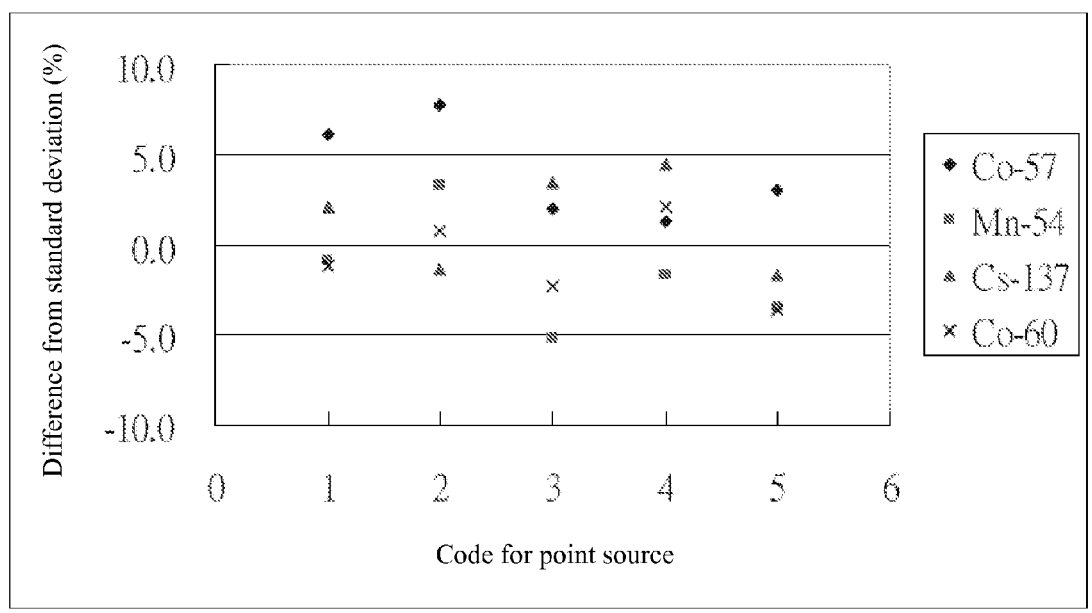
FIG. 7 is the testing diagram for activity accuracy for planar point sources.

In the shielding of 10 cm thickness in the iron chamber, five measurements are conducted for the point sources for radionuclides $^{57}$Co, $^{137}$Cs, $^{54}$Mn and $^{60}$Co at 25 cm from the pure germanium detector that has 40% counting efficiency of the sodium iodine (thallium) detector. According to the primary standard in national and weight method, the activity for each point source is 1107Bq, 803Bq, 657Bq and 657Bq, respectively. The results for the point source measurement for the four radionuclides with pure germanium detector are compared to the activity of production point sources and the largest different is found less than 10%, as shown in FIG. 7.

Figure 8:
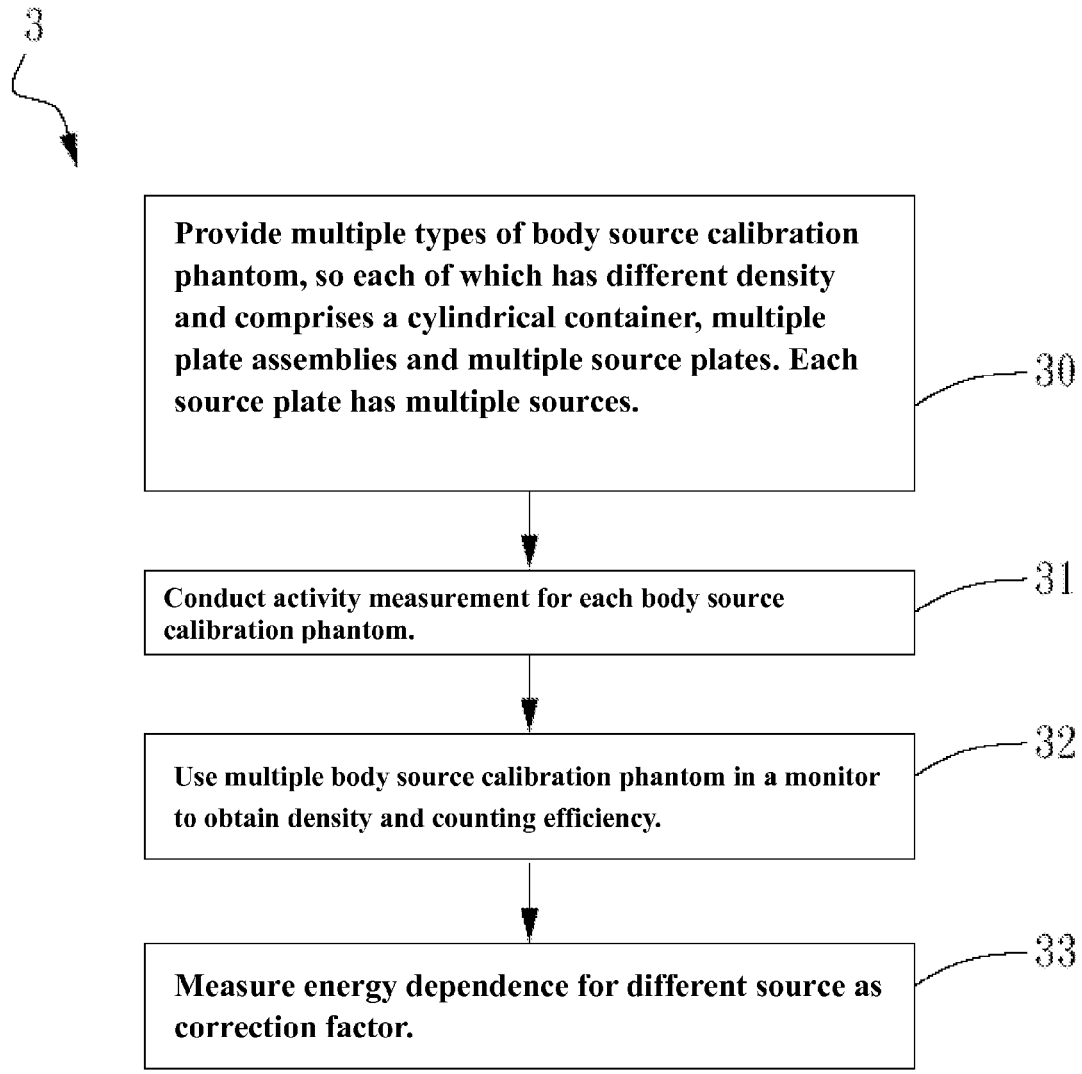
FIG. 8 is the flow diagram for the calibration method for the drum-type volume source calibration phantom in the invention.

Please refer to FIG. 8 for the flow diagram for the calibration method for the source calibration phantom in the invention. The method 3 includes the following steps: first proceed with step 30 to provide a plurality of drum-type volume source calibration phantoms, and each drum-type volume source calibration phantom has different density, and the drum-type volume source calibration phantom has a drum-type container, a plurality of plate assemblies and a plurality of source plates, and each source plate has a plurality of sources. The step uses a drum-type volume source calibration phantom made of materials of different densities as in previously mentioned Table 1 and assembled by source plates of different sources. For example, Table 1 has five materials, and the source plate has three sources of choice, including $^{54}$Mn, $^{60}$Co and $^{137}$Cs. In this way there are 15 calibration phantoms of different materials and different sources.

Step 31 is following to conduct activity measurement for each drum-type volume source calibration phantom. The following describes the method to measure activity uniformity.

3. Activity Uniformity

Figure 9:
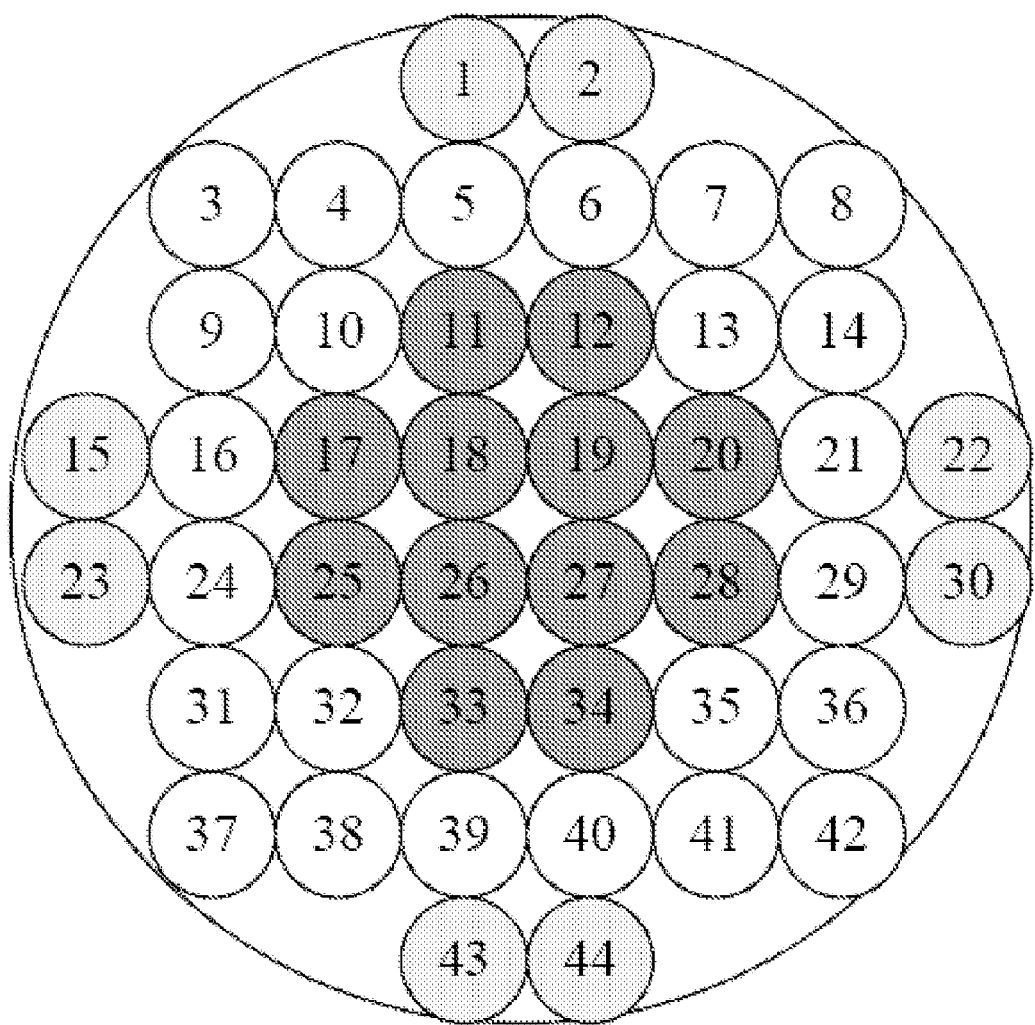
FIG. 9 is the layout of 44 sources on the source plate.
Figure 10A:
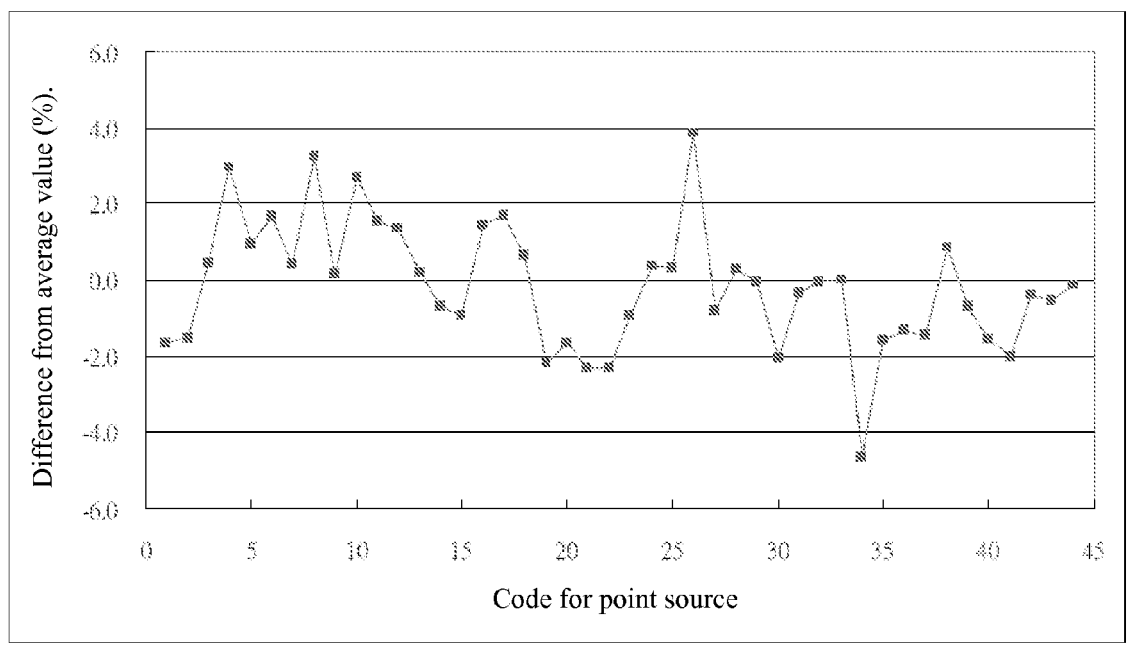
Figure 10B:
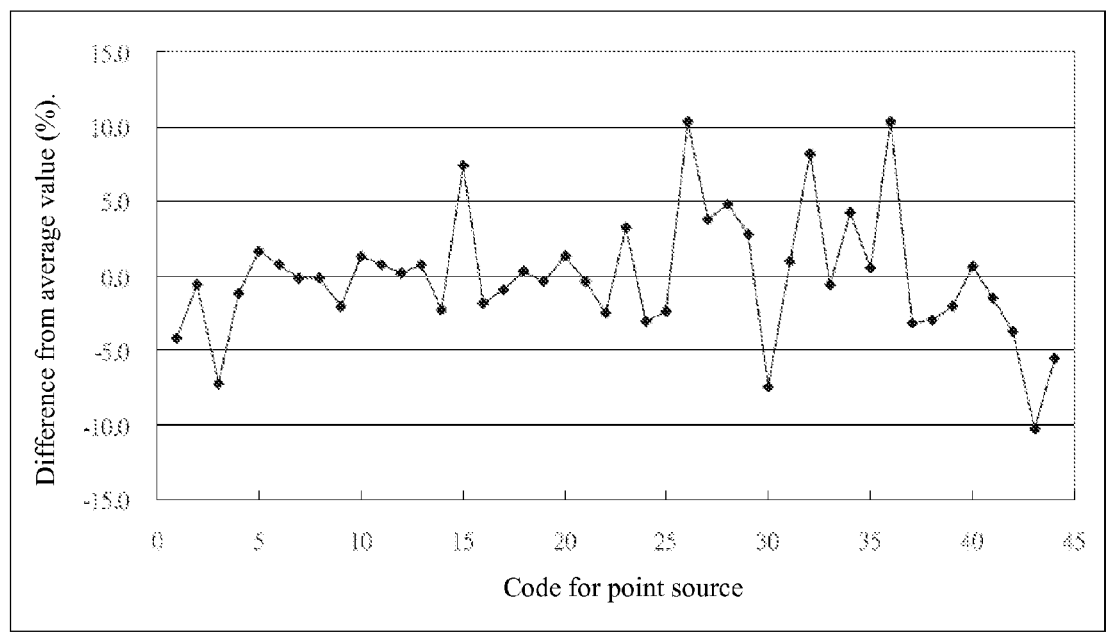
Figure 10C:
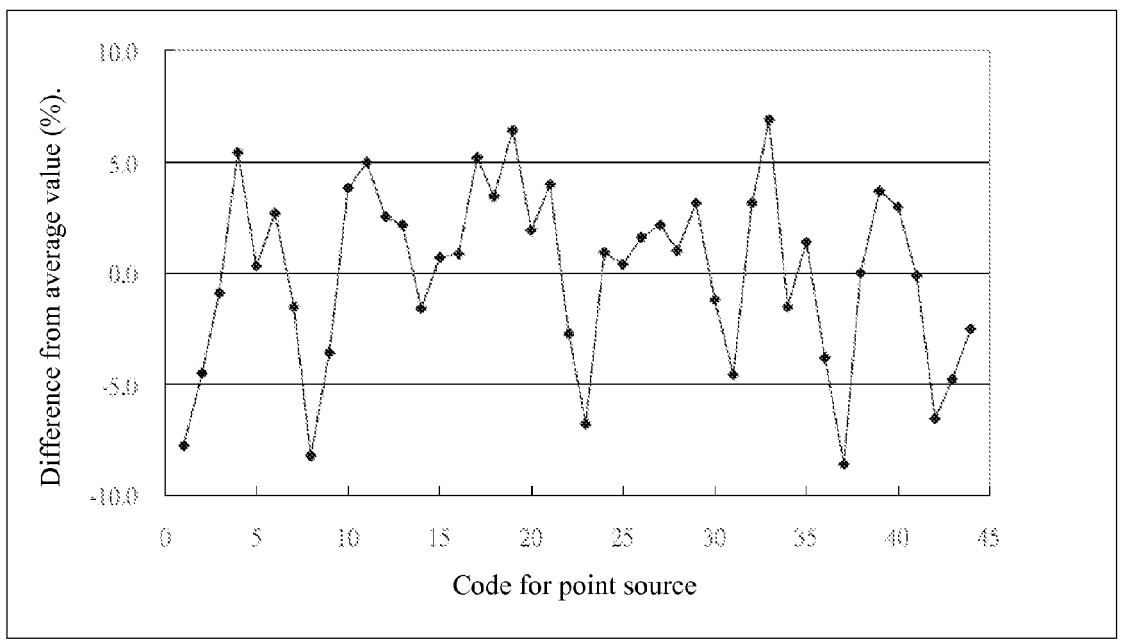
Figure 10D:
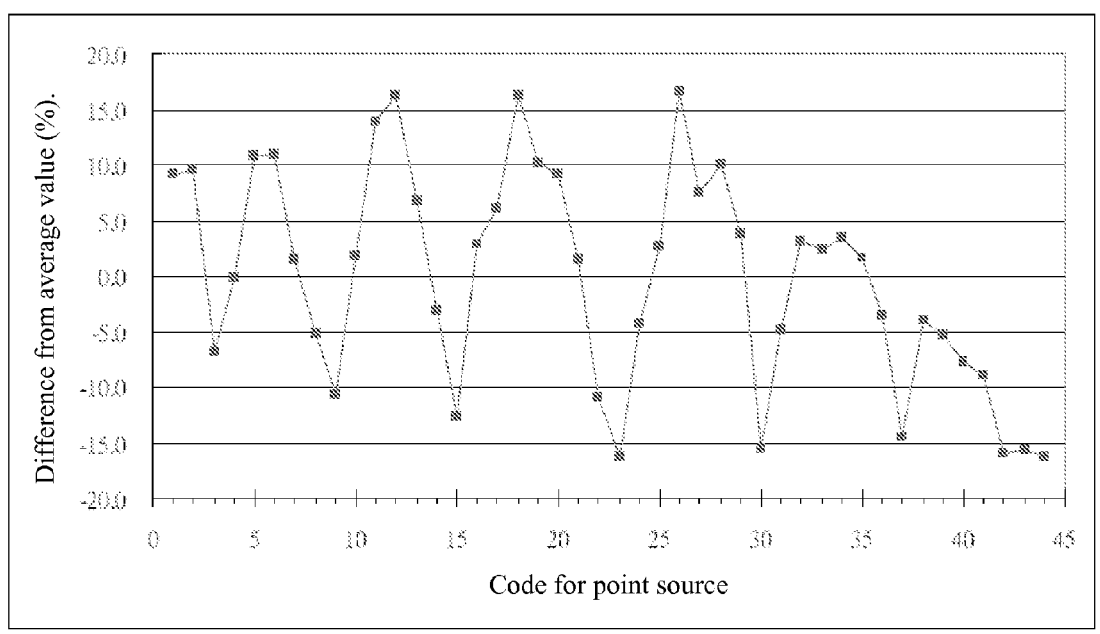

A drum-type sodium iodine (thallium) detector in 3-inch diameter and 3-inch thickness is placed in a lead can in 12 cm diameter, 6 cm inner diameter and 50 cm height. The 3 cm thick lead can block the adjacent radioactive interference from background and the planar source. 5 cm from the detector surface, there place circular planar sources. In total, there are 44 point sources of circle in 3 cm diameter (as shown in FIG. 9). The result of the average counting rate for the large-area sources for $^{57}$Co, $^{137}$Cs, $^{54}$Mn and $^{60}$Co are shown in the figure, and are 27603 cps, 4992 cps, 6082 cps and 12703 cps, respectively. The respective counting rate for the four radionuclides is larger than the background counting rate by seven times, with standard deviation of 2.3%, 4.4%, 4.0% and 10.3%, respectively. The point source counting rate in 44 circular points for the four radionuclides and the average are different by 11.1%, 13.2%, 8.6% and 20.0%, respectively. Relatively larger different from the average happens to those adjacent point sources to the center of the circular planar source and is attributed to the radiation of the adjacent sources. The relatively small difference from the average happens to those adjacent point sources at the periphery of the circular planar source and is attributed to the relatively small radiation of the adjacent sources. The results of the abnormal values [(individual counting rate—average counting rate)/3 times of standard deviation] for the 44 counting rates for another four radionuclides, $^{57}$Co, $^{137}$Cs, $^{54}$Mn and $^{60}$Co, are 0.7%, 0.7%, 0.7% and 0.9%, respectively. The difference between the counting rates of the 44 circular point sources for each of the radionuclides, $^{57}$Co, $^{137}$Cs, $^{54}$Mn and $^{60}$Co, and the average is shown from FIG. 10A to FIG. 10D.

As shown in FIG. 8, the following is step 32 to use a plurality of drum-type volume source calibration phantoms in a detector (as shown in FIG. 1) to obtain correlation between density and counting efficiency. The following describes the method of counting efficiency.

4. Counting Efficiency

Five source calibration phantoms of materials of different densities are placed in a detector shielding for measurement. Among all, cement and glass have natural radioactive substances. Their counting rates are 2.63 times and 1.19 times of the background counting rate (950 cps) respectively. The efficiency measurement results for the drum-type volume source calibration phantoms for the radionuclides of $^{54}$Mn, $^{60}$Co and $^{137}$Cs are shown in Table 2. The counting efficiency is mainly related to the mass attenuation coefficient of the material and energy. Since radionuclide $^{57}$Co energy is low (122 keV and 157 keV), the counting rate at density 0.15 g/cm$^3$ and 0.49 g/cm$^3$ is slightly higher than background value. The counting efficiency is lower than 1%.

When the density is larger than 0.49 g/cm$^3$, the $^{57}$Co energy is blocked by the material, and there is no significant counting rate. Within five material density range 0.15 g/cm$^3$~2.4 g/cm$^3$, the counting efficiency is 20.7%~2.1% for radionuclide $^{54}$Mn, 41.6%~6.9% for $^{60}$Co and 14.2%~1.1% for $^{137}$Cs. The fitting curve for the relationship between the density of the drum-type volume source calibration phantom and the radionuclide counting efficiency is shown in FIG. 11. For the trend of variation in density and radionuclide counting efficiency, radionuclide $^{60}$Co is more significant, radionuclide $^{54}$Mn is the next, and while $^{137}$Cs has the least variation. All of another three radionuclides have high efficiency at low density, and low efficiency at high density. It indicates high-density material has large self-shielding effect. At low density, $^{60}$Co and $^{137}$Cs have very different efficiency; at high density, $^{60}$Co and $^{137}$Cs have small difference in efficiency.

When the density is the same, counting efficiency is proportional to radionuclide energy. High energy means high counting efficiency. High energy is easy to penetrate material and captured by the detector. Thus, the counting efficiency for radionuclide $^{60}$Co (1250 keV) is higher than that for low energy radionuclide $^{54}$Mn (834 keV) and radionuclide $^{137}$Cs (662 keV). On the other hand, when the density is 1.1 g/cm$^3$~2.4 g/cm$^3$, the counting efficiency for radionuclides have small variation. The fitting curve gradually levels off. Radionuclide $^{54}$Mn and radionuclide $^{137}$Cs have similar energy, so they have similar trend.

TABLE 2

Radionuclide Efficiency Measurement Results for Drum-type volume source calibration phantom

| Density (g/cm$^3$) | Efficiency (%) | | |
| --- | --- | --- | --- |
| | $^{60}$Co | $^{54}$Mn | $^{137}$Cs |
| 0.15 | 41.6 | 20.7 | 14.2 |
| 0.49 | 29.9 | 13.0 | 8.0 |
| 1.13 | 18.3 | 6.6 | 3.7 |
| 1.97 | 10.0 | 3.4 | 1.8 |
| 2.37 | 6.9 | 2.1 | 1.1 |

Back to FIG. 8, proceeds step 33 to measure energy dependence for different sources, as correction factor. The following describes energy dependence.

5. Energy Dependence

The ratios of the counting efficiency for radionuclides $^{54}$Mn and $^{60}$Co to that for radionuclide $^{137}$Cs are shown in Table 3. When the density is 0.15 g/cm$^3$, they are 1.46 and 2.94 respectively; when the density is 0.49 g/cm$^3$, they are 1.62 and 3.74 respectively; when the density is 1.13 g/cm$^3$, they are 1.77 and 4.94; when the density is 1.97 g/cm$^3$, they are 1.91 and 5.69; when the density is 2.37 g/cm$^3$, they are 1.99 and 6.48. It indicates that the one with higher energy relative to $^{137}$Cs has higher ratio in radionuclide counting efficiency. $^{60}$Co has average energy two times higher than $^{137}$Cs. It has very clear efficiency ratio to $^{137}$Cs. At low density 0.15 g/cm$^3$, it is about 3 times, while at high density 2.37 g/cm$^3$ it is about 6.5 times. The $^{54}$Mn energy is slightly higher than $^{137}$Cs energy. Thus, at different density, the ratio of radionuclide counting efficiency to $^{137}$Cs is similar and does not vary by more than two times. The ratio of counting efficiency of individual radionuclide $^{54}$Mn and $^{60}$Co to radionuclide $^{137}$Cs increases with density. At different density, the fitting curve for the counting efficiency of radionuclides relative to radionuclide $^{137}$Cs is shown in FIG. 12.

TABLE 3

Ration of Counting Efficiency of Radionuclides to $^{137}$Cs

| Density | Relative Ratio | |
| --- | --- | --- |
| (g/cm$^3$) | $^{54}$Mn/$^{137}$Cs | $^{60}$Co/$^{137}$Cs |
| 0.15 | 1.46 | 2.94 |
| 0.49 | 1.62 | 3.74 |
| 1.13 | 1.77 | 4.94 |
| 1.97 | 1.91 | 5.69 |
| 2.37 | 1.99 | 6.48 |

The above examples are only preferred embodiments of the invention, but not to limit the scope of the invention. Those with equivalent changes and modification with the principles of the invention shall be considered within the scope of the invention.

What is claimed is:

1. A drum-type volume source calibration phantom is placed in a detector, there is an accommodating space inside the detector for receiving a plurality of radioactivity detectors, and the drum-type volume source calibration phantom comprising:
    a drum-type container;
    a plurality of plate assemblies, stacking inside the drum-type container; and
    at least a source plate, located between adjacent plate assemblies, and each source plate having a plurality of sources.

2. As described in claim 1 for a drum-type volume source calibration phantom, the plate material can be metal or non-metal.

3. As described in claim 2 for a drum-type volume source calibration phantom, the non-metal can be paper, wood, plastics, cement and glass.

4. As described in claim 1 for a drum-type volume source calibration phantom, the source is a γ source.

5. As described in claim 1 for a drum-type volume source calibration phantom, the γ source can be $^{57}$cobalt, $^{137}$cesium, $^{54}$manganese, $^{60}$cobalt or combination of either one.

6. As described in claim 1 for a drum-type volume source calibration phantom, the source is a circular source.

7. As described in claim 6 for a drum-type volume source calibration phantom, the circular source has diameter less than 5 cm.

8. As described in claim 1 for a drum-type volume source calibration phantom, the source plate further comprising:
    a bottom cover;
    a leak-proof filter layer, formed on the bottom cover, and having a plurality of sources; and
    a top cover, formed on the leak-proof filter layer, to protect the sources.

9. As described in claim 1 for a drum-type volume source calibration phantom, the source plate is a circular source plate.

10. As described in claim 1 for a drum-type volume source calibration phantom, the drum-type container is a 55-gallon container.

11. A calibration method for drum-type volume source calibration phantom comprising steps:
    providing a plurality of drum-type volume source calibration phantoms, each drum-type volume source calibration phantom having different density, and the drum-type volume source calibration phantom having a drum-type container, a plurality of plate assemblies and a plurality of source plates, and each source plate having a plurality of sources;
    performing activity measurement for every drum-type volume source calibration phantom;
    using the drum-type volume source calibration phantoms in a detector to obtain correlation between density and counting efficiency; and
    measuring energy dependence of different sources as correction factor.

12. As described in claim 11 for the calibration method for a drum-type volume source calibration phantom, the plate can be metal and non-metal.

13. As described in claim 11 for the calibration method for a drum-type volume source calibration phantom, the non-metal can be paper, wood, plastics, cement and glass.

14. As described in claim 11 for the calibration method for a drum-type volume source calibration phantom, the source is a γ source.

15. As described in claim 14 for the calibration method for a drum-type volume source calibration phantom, the γ source can be $^{57}$cobalt, $^{137}$cesium, $^{54}$manganese, $^{60}$cobalt or combination of either one.

* * * * *